United States Patent [19]
Kashitani

[11] Patent Number: 5,757,518
[45] Date of Patent: May 26, 1998

[54] IMAGE SCANNER

[75] Inventor: Atsushi Kashitani, Tokyo, Japan

[73] Assignee: NEC Corporation, Tokyo, Japan

[21] Appl. No.: 590,556

[22] Filed: Mar. 21, 1996

[30] Foreign Application Priority Data

Mar. 30, 1995 [JP] Japan ..................... 7-073210

[51] Int. Cl.$^6$ ..................................... H04N 1/04
[52] U.S. Cl. ........................... 358/474; 358/497
[58] Field of Search ..................... 358/474, 497,
358/486, 488, 487, 494, 451, 449, 406,
401, 505, 504, 501; 250/208.1, 235, 234,
236; 355/55, 62

[56] References Cited

U.S. PATENT DOCUMENTS

| | | | |
|---|---|---|---|
| 4,558,374 | 12/1985 | Kurata et al. | 358/451 |
| 4,712,142 | 12/1987 | Tomita et al. | 358/494 |
| 5,019,917 | 5/1991 | Hata et al. | 358/452 |
| 5,043,827 | 8/1991 | Beikirch | 358/471 |
| 5,223,948 | 6/1993 | Sakurai et al. | 358/404 |
| 5,276,530 | 1/1994 | Siegel | 358/406 |
| 5,362,958 | 11/1994 | Ando | 250/208.1 |
| 5,416,609 | 5/1995 | Matsuda et al. | 358/474 |
| 5,497,236 | 3/1996 | Wolff et al. | 358/406 |
| 5,610,730 | 3/1997 | Osipchuk | 358/494 |

FOREIGN PATENT DOCUMENTS

62-291259  12/1987  Japan.

*Primary Examiner*—Edward L. Coles, Sr.
*Assistant Examiner*—Fan Lee
*Attorney, Agent, or Firm*—Sughrue, Mion, Zinn, Macpeak & Seas, PLLC

[57] ABSTRACT

An image scanner has a reflecting mirror for reflecting a light beam from an original, a one-dimensional image sensor for scanning the original in a main scanning direction with the reflected light beam from the reflecting mirror to produce a partial image of the original, and an auxiliary scanning mechanism for angularly moving the reflecting mirror to cause the reflected light to scan the original in an auxiliary scanning direction transverse to the main scanning direction, thereby to enable the one-dimensional image sensor to produce in main scanning cycles respective partial images of the original which may be combined into a two-dimensional image of the original. An image converter converts the partial images depending on changes in an optical path length from the original to the one-dimensional image sensor. The image scanner thus constructed is relatively small in size and simple in structure, prevents produced two-dimensional images from being distorted, and is capable of reading images at high speed.

6 Claims, 11 Drawing Sheets

(before convert)    (after convert)

IMAGE SCANNER

BACKGROUND OF THE INVENTION

1. Field of the Invention

The present invention relates to an image scanner for scanning an original with a light beam reflected by a reflecting mirror and reading a reflected light beam with a one-dimensional image sensor, and more particularly to an image scanner for compensating for a distortion of a read image due to different optical path lengths.

2. Description of the Related Art

One conventional image scanner for scanning an original with a light beam reflected by a reflecting mirror in an auxiliary scanning direction and reading a reflected light beam with a one-dimensional image sensor will be described below with reference to FIGS. 1(a) and 1(b) of the accompanying drawings. FIG. 1(b) shows the optical relationship between a reading unit 1000 and an original 1004.

In the reading unit 1000, a reflected light beam from a reading line on the original 1004 is directed toward a condenser lens 1002 by a reflecting mirror 1001 that comprises a plane mirror. The reflecting mirror 1001 converges the reflected light beam onto a line CCD (charge-coupled device) 1003 as a one-dimensional image sensor, which reads the applied light beam as a one-dimensional image in a main scanning direction indicated by the arrow A in FIG. 1(a). When the plane mirror 1001 is angularly moved in the direction indicated by the arrow C in FIG. 1(b), the reading line on the original 1004 is moved in an auxiliary scanning direction indicated by the arrow B in FIG. 1(a), and the line CCD 1003 reads successive light beams as successive partial images in synchronized cycles. The successive partial images read by the line CCD 1003 are combined into a two-dimensional image which represents the original 1004.

Figure 1A:
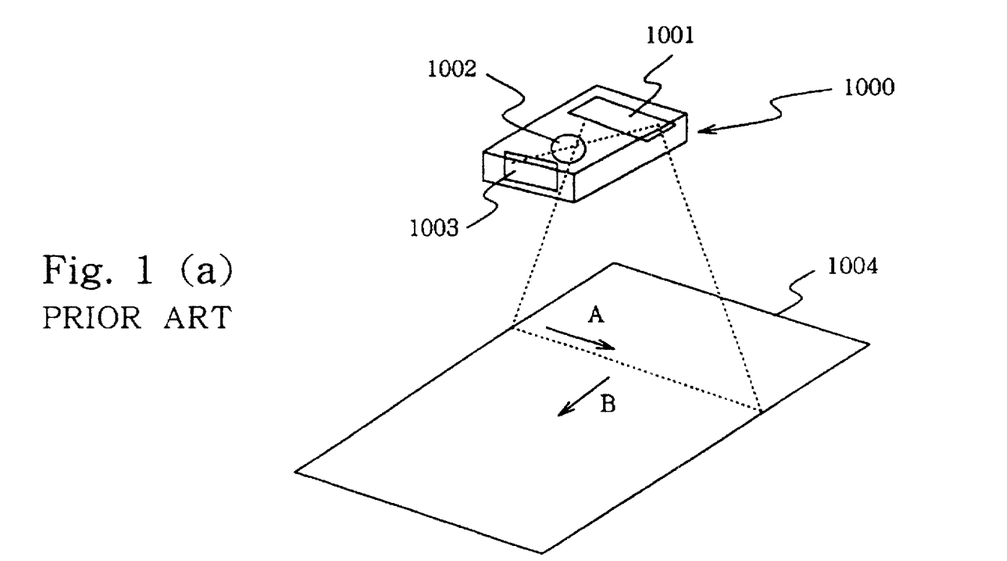
FIG. 1(a) is a schematic perspective view of a conventional image scanner in which a reflecting mirror is angularly moved to scan an original with a light beam in an auxiliary scanning direction.
Figure 1B:
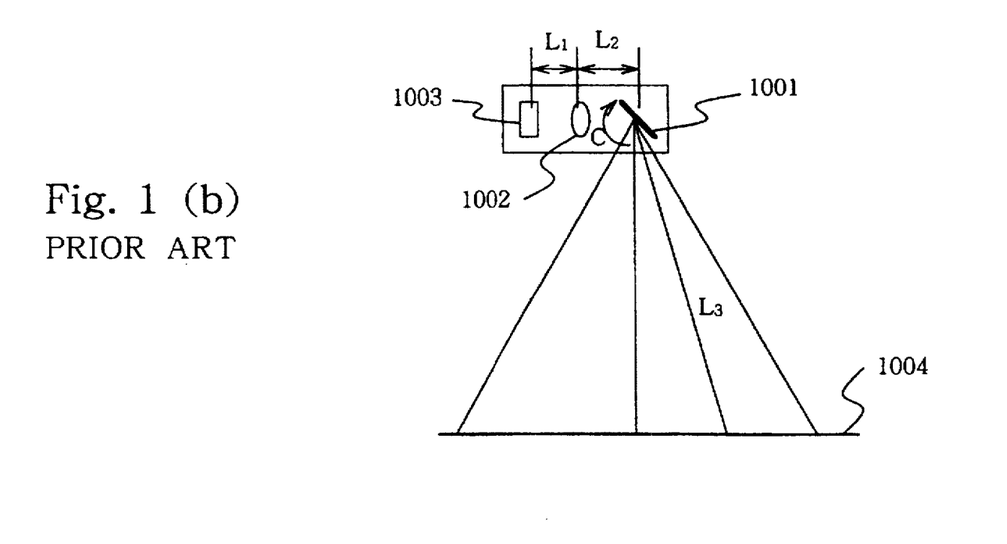
FIG. 1(b) is a schematic side elevational view of the conventional image scanner shown in FIG. 1(a)

The conventional image scanner shown in FIGS. 1(a) and 1(b) may be relatively small in size because only the reflecting mirror 1001 is angularly moved to scan the original 1004 in the auxiliary scanning direction. However, the conventional image scanner is disadvantageous in that the two-dimensional image produced by combining the successive partial images read by the line CCD 1003 tends to be distorted since an optical path length $L_3$ from the reflecting mirror 1001 to the reading line varies as the original 1004 is scanned in the auxiliary scanning direction.

Figure 2:
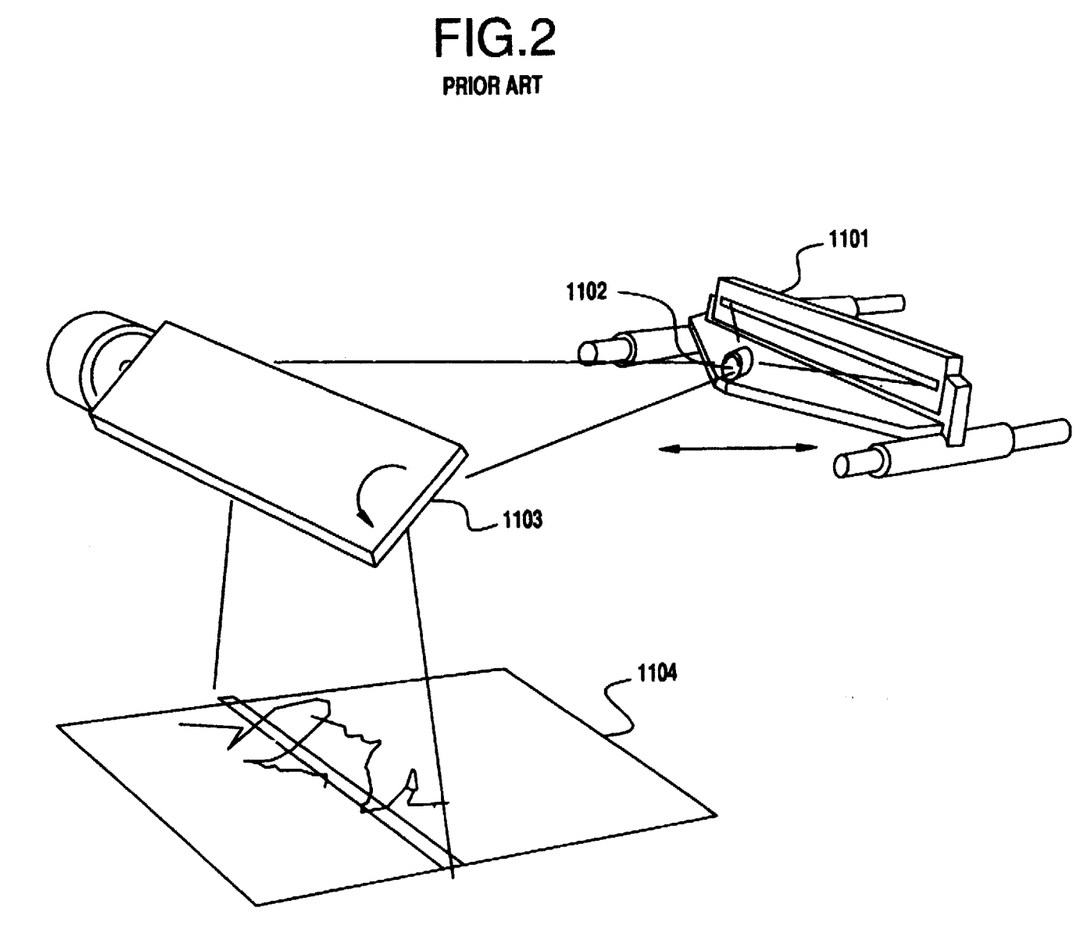
FIG. 2 is a schematic perspective view of another conventional image scanner in which a reflecting mirror is angularly moved to scan an original with a light beam in an auxiliary scanning direction and a condenser lens and a one-dimensional image sensor are moved parallel to an optical axis to keep constant an optical path length from the condenser lens to a reading line on the original.

Japanese laid-open patent publication No. 62-291259 discloses a solution to the above problem. According to the disclosed solution, as shown in FIG. 2 of the accompanying drawings, when a reflecting mirror 1103 is angularly moved, a condenser lens 1102 and a one-dimensional image sensor 1101 are simultaneously moved parallel to a read surface of an original 1104, thereby varying an optical path length $L_2$ (see FIG. 1(b)) from the reflecting mirror 1103 to the condenser lens 1102 in order to compensate for the change in the optical path length $L_3$ which is caused by the rotation of the reflecting mirror 1103. As a result, the optical path length from the one-dimensional image sensor 1101 to the reading line on the original 1104 remains constant, so that a two-dimensional image produced by combining successive partial images read by the one-dimensional image sensor 1101 is prevented from being distorted.

Another effort is to use a zoom lens as a condenser lens whose magnification is varied in synchronism with rotation of a reflecting mirror for thereby preventing a two-dimensional image produced by combining successive partial images from being distorted.

As described above, the first conventional image scanner in which the image sensor and the condenser lens are not moved and the condenser lens does not comprise a zoom lens is problematic in that the resultant two-dimensional image is distorted.

The second conventional image scanner in which the image sensor and the condenser lens are moved to keep the overall optical path lens constant requires a space and a mechanism for translating the image sensor and the condenser lens, and is relatively large in size and complex in structure. Another shortcoming is that as the center of gravity of the mechanical parts varies upon movement of the image sensor and the condenser lens, they tend to vibrate, and it is difficult to increase the reading speed without adversely affecting the quality of produced two-dimensional images.

The third proposal which employs the zoom condenser lens suffers a problem in that since the zoom condenser lens is relatively large in size, the image scanner itself is also relatively large in size and complex in structure.

SUMMARY OF THE INVENTION

It is therefore an object of the present invention to provide an image scanner which is relatively small in size and simple in structure, prevents produced two-dimensional images from being distorted, and is capable of reading images at high speed.

According to the present invention, there is provided an image scanner comprising a reflecting mirror for reflecting a light beam from an original, a one-dimensional image sensor for scanning the original in a main scanning direction with the reflected light beam from the reflecting mirror to produce a partial image of the original, an auxiliary scanning mechanism for angularly moving the reflecting mirror to cause the reflected light to scan the original in an auxiliary scanning direction transverse to the main scanning direction, thereby to enable the one-dimensional image sensor to produce in main scanning cycles respective partial images of the original which may be combined into a two-dimensional image of the original, and an image converter for converting the partial images depending on changes in an optical path length from the original to the one-dimensional image sensor.

The image converter may comprise an optical path length sensor for measuring the optical path length when the original is scanned in the auxiliary scanning direction, and image converting means for converting the partial images depending on the optical path length measured by the optical path length sensor.

Alternatively, the image converter may comprise a counter for counting the main scanning cycles, and image converting means for converting the partial images depending on a main scanning cycle count from the counter. The image converter may further comprise a memory for storing conversion tables calculated according to different conversion coefficients depending on respective main scanning cycle counts, the image converting means comprising means for converting the partial images based on a conversion table read from the memory according to the main scanning cycle count from the counter.

Further, alternatively, the image converter may comprise an image memory for storing entire image data of the original and separately outputting image data of partial images in the respective main scanning cycles, a counter for counting the number of times that the image data of partial images are outputted from the image memory, as a main scanning cycle count, and image converting means for converting the partial images depending on the main scanning cycle count from the counter. The image converter may further comprise a memory for storing conversion tables calculated according to different conversion coefficients depending on respective main scanning cycle counts, the image converting means comprising means for converting the partial images based on a conversion table read from the memory according to the main scanning cycle count from the counter.

Alternatively, the image scanner may further comprise reflecting mirror angular displacement detecting means for detecting an angular displacement of the reflecting mirror when the original is scanned in the auxiliary scanning direction, and the image converter may comprise image converting means for converting the partial images depending on the angular displacement detected by the reflecting mirror angular displacement detecting means. The image converter may further comprise a memory for storing conversion tables calculated according to different conversion coefficients depending on respective angular displacements of the reflecting mirror, the image converting means comprising means for converting the partial images based on a conversion table read from the memory according to the angular displacement detected by the reflecting mirror angular displacement detecting means. Alternatively, the image converter may further comprise a memory for storing conversion tables calculated according to different conversion coefficients depending on respective main scanning cycle counts, the image converting means comprising means for determining a main scanning cycle count from the angular displacement detected by the reflecting mirror angular displacement detecting means, and converting the partial images based on a conversion table read from the memory according to the determined main scanning cycle count.

With the arrangement of the present invention, since the partial images produced in the respective main scanning cycles are converted based on changes in the optical path length for compensating for any image distortions, the optical components of the image scanner remain in constant positions.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 3:
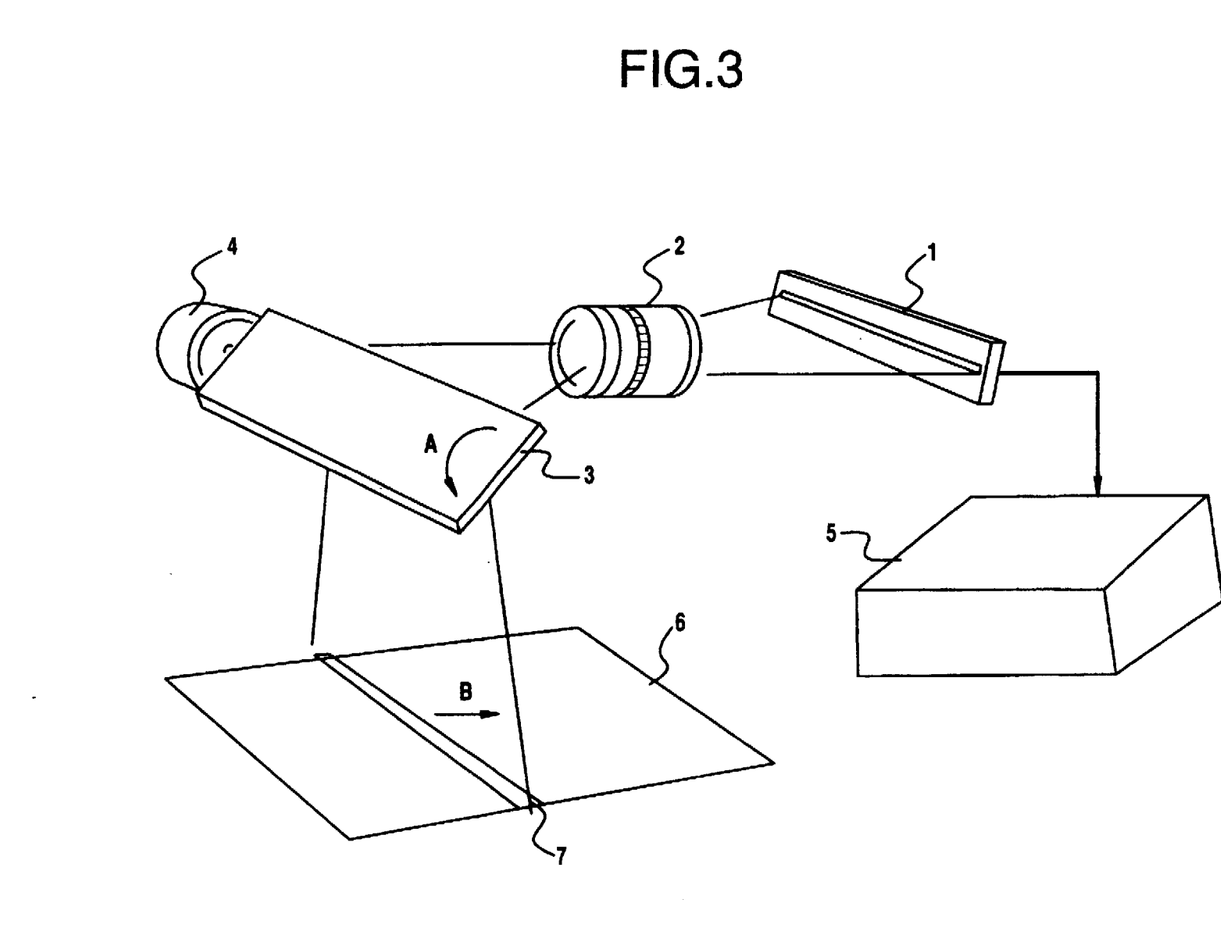
FIG. 3 is a schematic perspective view of an image scanner according to a first embodiment of the present invention.

As shown in FIG. 3, an image scanner according to a first embodiment of the present invention comprises a one-dimensional image sensor 1, a condenser lens 2, a reflecting mirror 3, an auxiliary scanning mechanism 4 for angularly moving the reflecting mirror 3, an image converter 5 for processing an image detected by the one-dimensional image sensor 1, and an original 6 to be read.

The reflecting mirror 3 directs a light beam reflected from a reading line 7 on the original 6 toward the condenser lens 2. The condenser lens 2 converges the reflected beam from the reflecting mirror 3 onto the one-dimensional image sensor 1. In the illustrated embodiment, the one-dimensional image sensor 1 comprises an image sensor (PD3733 manufactured by NEC which has a 2088-bit CCD array device. The one-dimensional image sensor 1 converts the applied reflected light beam into an electric signal, and transfers the electric signal as representing a partial image to the image converter 5.

The auxiliary scanning mechanism 4 angularly moves the reflecting mirror 3 in the direction indicated by the arrow A about its own axis to move the reading line 7 on the original 6 in the direction indicated by the arrow B. In this embodiment, the auxiliary scanning mechanism 4 comprises a stepping motor and a speed reducer which are combined with each other. The one-dimensional image sensor 1 reads the reflected light beam applied thereto each time the stepping motor of the auxiliary scanning mechanism 4 is energized to angularly move the reflecting mirror 3 in one step, and generates and transfers successive partial images to the image converter 5.

If the reflecting mirror 3 is angularly moved at a sufficiently constant speed by the auxiliary scanning mechanism 4, then the one-dimensional image sensor 1 may be controlled to start reading the applied light beam at constant time intervals at the same time that the auxiliary scanning mechanism 4 starts angularly moving the reflecting mirror 3.

Figure 4:
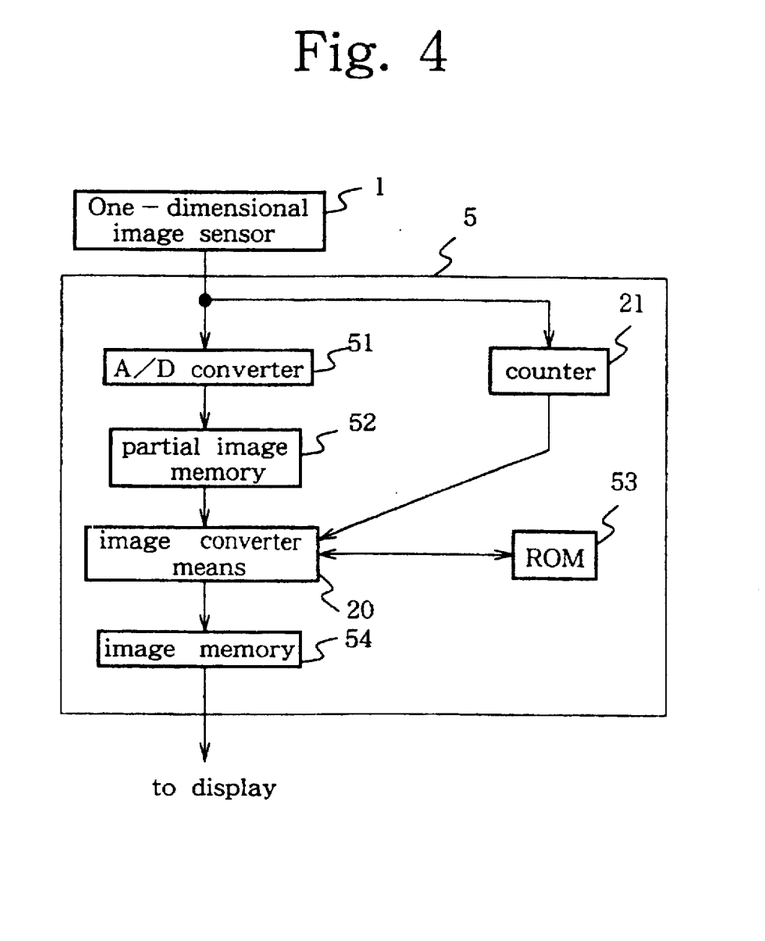
FIG. 4 is a block diagram of an image converter in the image scanner shown in FIG. 3.

FIG. 4 shows in block form the image converter 5 shown in FIG. 3.

As shown in FIG. 4, the image converter 5 comprises an image converting means 20, a counter 21 for counting a main scanning cycle to produce a main scanning cycle count N each time it is supplied with a partial image signal from the one-dimensional image sensor 1, an A/D (analog-todigital) converter 51, a partial image memory 52, a ROM (read-only memory) 53 which stores conversion tables determined by conversion coefficients which differ from one main scanning cycle count N to the next main scanning cycle count N, and an image memory 54 for storing image data from the image converting means 20.

The A/D converter 51 converts a partial image signal from the one-dimensional image sensor 1 into a digital image signal, and transfers the digital image signal to the partial image memory 52. The image converting means 20 reads a conversion table corresponding to the main scanning cycle count N from the counter 21 from the ROM 53, converts the digital image signal stored in the partial image memory 52 into image data, and transfers the converted image data to the image memory 52. The image data stored in the image memory 52 are then outputted to an image display unit (not shown).

If the number of arrays of the one-dimensional image sensor 1 is represented by 2088 bits and the above reading process of the one-dimensional image sensor 1 and the above image converting process of the image converting means 20 are repeated 3000 times, then the image memory 54 stores two-dimensional image data comprising 2088× 3000 pixels.

The ROM 53 stores conversion tables for enlarging partial images, calculated with respect to different cycle counts N which represent the numbers of main scanning cycles of the one-dimensional image sensor 1. A process of calculating a conversion table will be described below with reference to FIGS. 5(a) and 5(b) in connection with an example in which the original 6 has an A4 size, the reflecting mirror 3 has its center positioned directly above the center of the original 6, the axis about which the reflecting mirror 3 is positioned at a height "h" (mm) above the original 6, and the original 6 of A4 size is longitudinally scanned in the auxiliary scanning direction.

Figure 5:
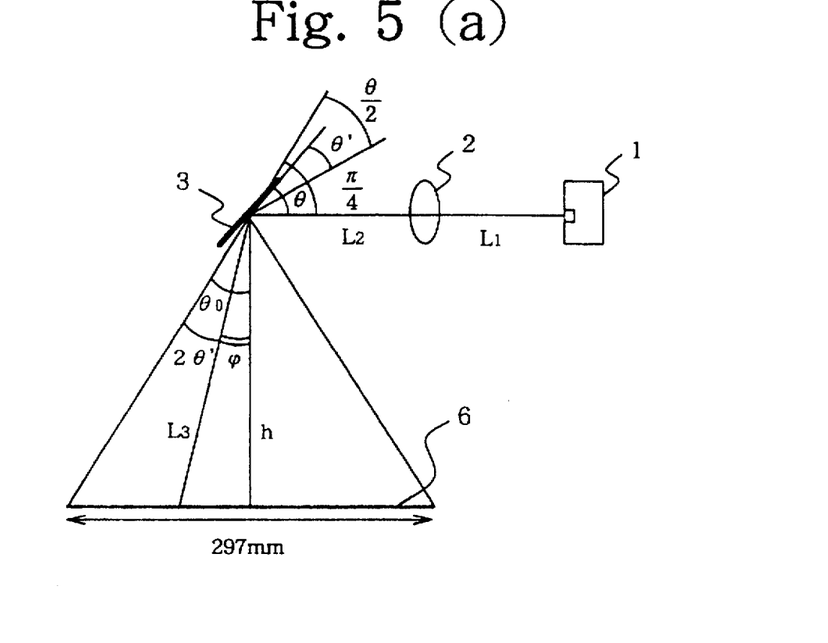
FIG. 5(a) is a schematic side elevational view of a reflecting mirror and an original to be read in the image scanner shown in FIG. 3.
FIG. 5(b) is a diagram showing an image to be converted and an image which has been converted.

FIG. 5(a) shows an optical arrangement of the components of the image scanner shown in FIG. 3 with the reflecting mirror 4 and the original 6 being viewed in side elevation. When the original 6 of A4 size is auxiliarily scanned in its longitudinal direction, the reflecting mirror 3 is angularly moved through an angle θ, given below, with respect to an optical axis that interconnects the center of the reflecting mirror 3 and the center of the condenser lens 2.

$$\pi/4 - \theta_0/2 \leq \theta \leq \pi/4 + \theta_0/2 \text{ [rad]}$$

where $$\theta_0 = \tan^{-1}(297/2h) \text{ [rad]}$$

If the auxiliary scanning mechanism 4 angularly moves the reflecting mirror 3 through a small angle Δθ while the one-dimensional image sensor 1 scans the original 1 once in the main scanning direction, then an angle θ' through which the reflecting mirror 3 is angularly moved when the one-dimensional image sensor 1 has scanned the original 1N times is represented by:

$$\theta' = \theta - (\pi/4 - \theta_0/2) = N \cdot \Delta\theta \quad (1)$$

An optical path length $L_3$ [mm] from the reflecting mirror 3 to the original 6 at the time the reflecting mirror 3 is angularly moved through the angle θ is expressed as follows:

$$L_3 = L_3 <N> \quad = h/\cos\phi = h/\cos(\theta_0 - 2\theta') \quad (2)$$
$$= h/\cos(\theta_0 - 2 \cdot \Delta\theta \cdot N)[mm]$$

where f<X> indicates that f is a function of X.

FIG. 5(b) shows an image to be converted which has been distorted to a barrel shape by changes in the optical path length and an image which has been converted in connection to the example in which the number of pixels in the main scanning direction is 2088 and the original 6 is scanned 3000 times in the main scanning direction.

It is assumed that x and y coordinate axes with an origin positioned at the center of the image to be converted are established as shown, and u and v coordinate axes with an origin positioned at the center of the image which has been converted are established as shown. The image to be converted has an width of 2088 bits when y=0, i.e., when the optical path length $L_3$=h. The image converting process serves to expand a partial image whose width has been reduced to d(y) due to a change in the optical path length $L_3$, to 2088 bits. The image converting process will be described in detail below.

If a certain pixel (u, v) of the image which has been converted has a position (x', y') in the xy coordinate system of the image to be converted, then the coordinates of the position (x', y') are related to the coordinates of the pixel (u, v) as follows:

$$\begin{cases} x' = \frac{d(v)}{2088} \cdot u \\ y' = v \end{cases} \quad (3)$$

where x' is a real number. If a partial image with y=1500 is produced when the main scanning cycle count N=1, then $$N = 1500 - v, \quad (4)$$

$$\frac{d(v)}{2088} = \frac{L_1 + L_2 + h}{L_1 + L_2 + L_3 <N>} = \frac{L_1 + L_2 + h}{L_1 + L_2 + L_3 <v>}$$

According to this embodiment, a maximum neighborhood method is used as a density conversion process. Specifically, if a pixel value at a point (x, y) in the image to be converted is expressed by p0(x, y), then a pixel value p(u, v) at the point (u, v) in the image that has been converted is represented by:

$$\begin{cases} \text{if } x' - [x'] < 0.5 & \text{then} \quad p(u,v) = p_0([x'],v) \\ \text{else} & p(u,v) = p_0([x'] + 1, v) \end{cases}$$

where [X] indicates a maximum integer not exceeding a real number X.

Therefore, a maximum neighborhood grid point ([x'], v) or ([x']+1, v) in the image to be converted, of the pixel (u, v) in the image that has been converted may be calculated according to the equations (2)-(4) above and stored in the ROM 53, and the pixel value p(u, v) may be determined by referring to the stored point.

Figure 6:
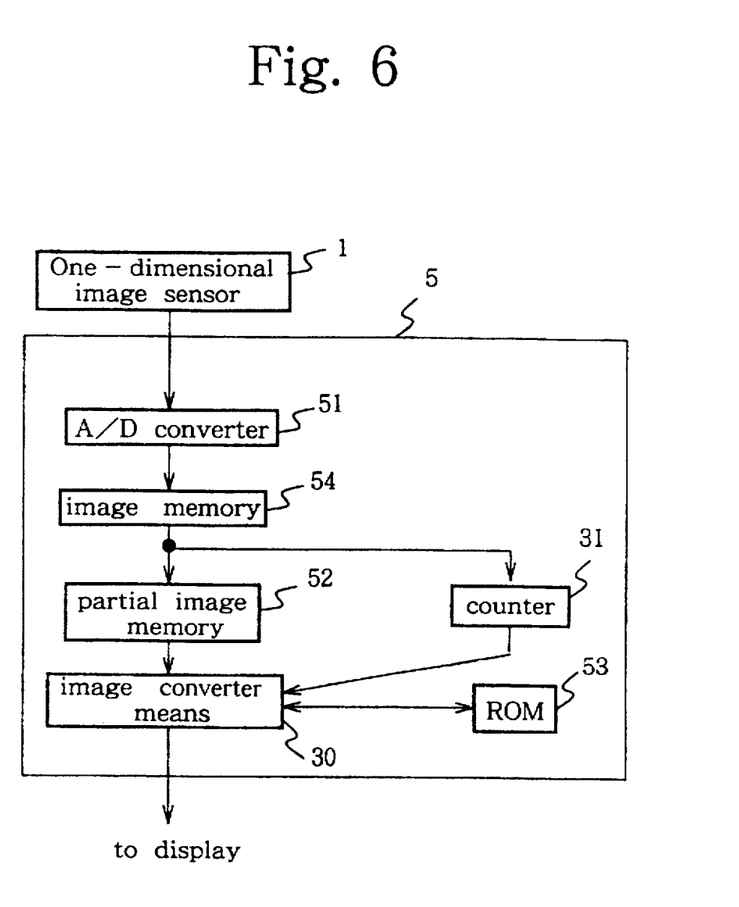
FIG. 6 is a block diagram of an image converter in an image scanner according to a second embodiment of the present invention.

FIG. 6 shows in block form an image converter in an image scanner according to a second embodiment of the present invention. The image scanner according to the second embodiment differs from the image scanner according to the first embodiment only as to the image converter. The image converter 5 shown in FIG. 6 is similar to the image converter 5 shown in FIG. 4 except for the image converting means and the counter. In FIG. 6, the image converting means and the counter are denoted by different reference numerals than those in FIG. 4, and the other components of the image converter 5 shown in FIG. 6 are denoted by the same reference numerals as those in FIG. 4.

As shown in FIG. 6, an A/D converter 51 converts partial image signals from the one-dimensional image sensor 1 to digital image signals, and successively transfers the digital image signals to an image memory 54. The transfer of digital image signals is repeated while the auxiliary scanning mechanism 4 is scanning the original 6 in the auxiliary scanning direction, until two-dimensional image data of the original 6 in its entirety are stored in the image memory 54. Then, partial image data corresponding to one main scanning cycle are loaded from the image memory 54 into a partial image memory 52. The counter 31 counts the number of times N that partial image data are loaded into the partial image memory 52, and supplies it as a main scanning cycle count N to an image converting means 30. A ROM 53 stores conversion tables calculated according to conversion coefficients which vary from main scanning cycle count N to main scanning cycle count N. The image converting means 30 reads a conversion table based on the main scanning cycle count N supplied from the counter 31 from the ROM 53, converts the partial image data stored in the partial image memory 52, and then transfers the converted image data to an image display unit.

The ROM 53 stores conversion tables for enlarging partial images, calculated with respect to different cycle counts N which represent the numbers of main scanning cycles of the one-dimensional image sensor 1. The conversion tables may be calculated in the same manner as with the first embodiment.

Figure 7:
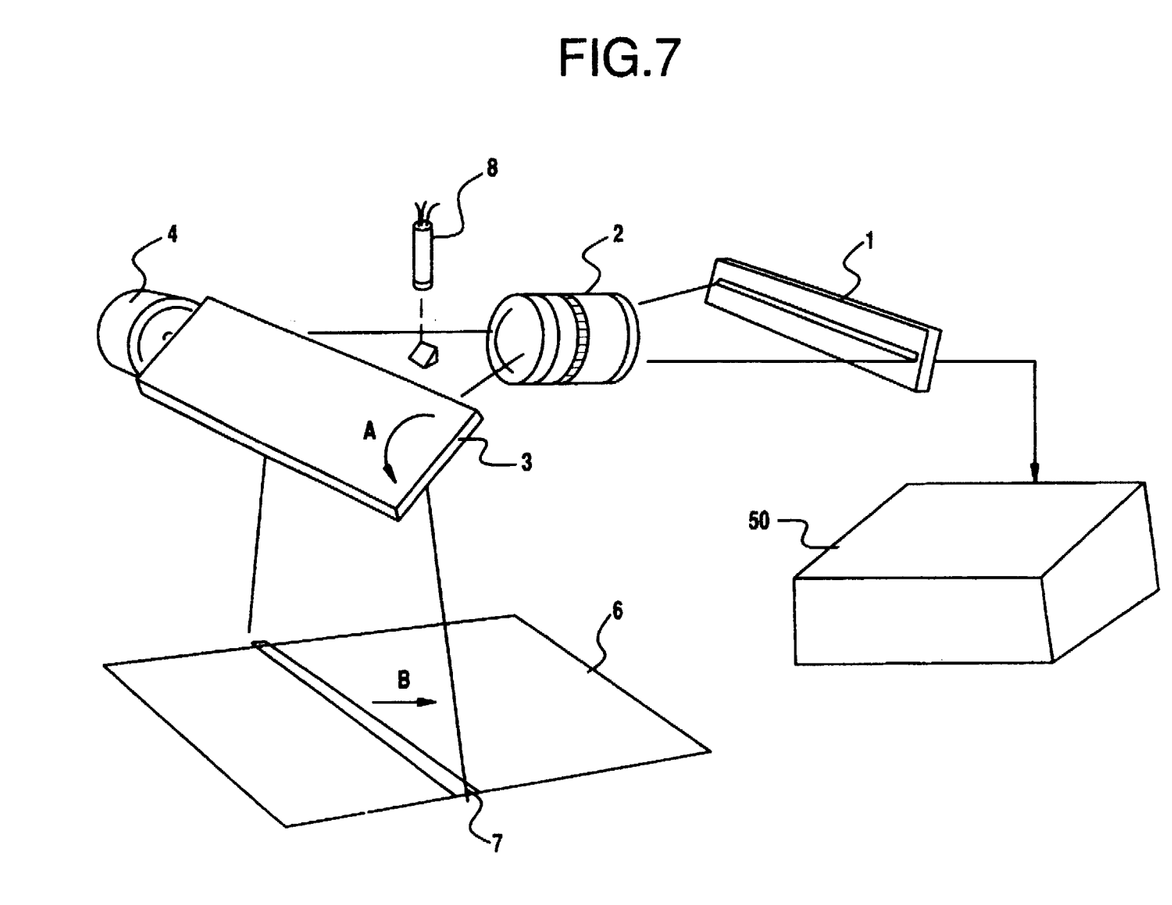
FIG. 7 is a schematic perspective view of an image scanner according to a third embodiment of the present invention.

FIG. 7 shows an image scanner according to a third embodiment of the present invention.

The image scanner according to the third embodiment is similar to the image scanner according to the first embodiment shown in FIG. 3 except that an optical path length sensor 8 for measuring an optical path length from the reflecting mirror 3 to the reading line 7 is placed between the condenser lens 2 and the reflecting mirror 3, and an image converter 50 for converting image data depending on the optical path length measured by the optical path length sensor 8 is employed in place of the image converter 5 shown in FIG. 3. The other components of the image scanner shown in FIG. 8 are identical to those shown in FIG. 3, and are denoted by the same reference numerals as those in FIG. 3.

The optical path length sensor 8 may comprise a small-size optical range finder. Since an optical path length L' from the optical path length sensor 8 to the reflecting mirror 3 is known, an optical path length from the reflecting mirror 3 to the reading line 7 on the original 6 can be measured by subtracting the known optical path length L' from the value measured by the optical path length sensor 8. The optical path length sensor 8 transfers the measured optical path length to the image converter 50.

Figure 8:
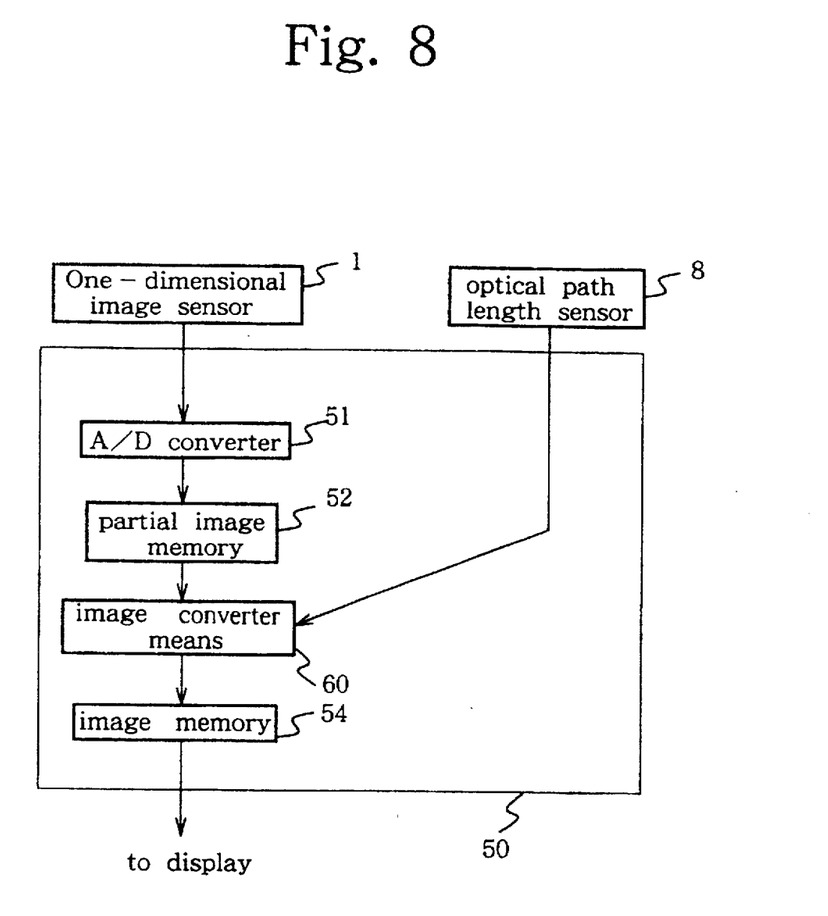
FIG. 8 is a block diagram of an image converter in the image scanner shown in FIG. 7.

FIG. 8 shows in block form the image converter 50. The image converter 50 shown in FIG. 8 is similar to the image converter 5 shown in FIG. 4 except for the image converting means. In FIG. 8, the image converting means is denoted by a different reference numeral than that in FIG. 4, and the other components of the image converter 50 shown in FIG. 8 are denoted by the same reference numerals as those in FIG. 4.

Figure 9:
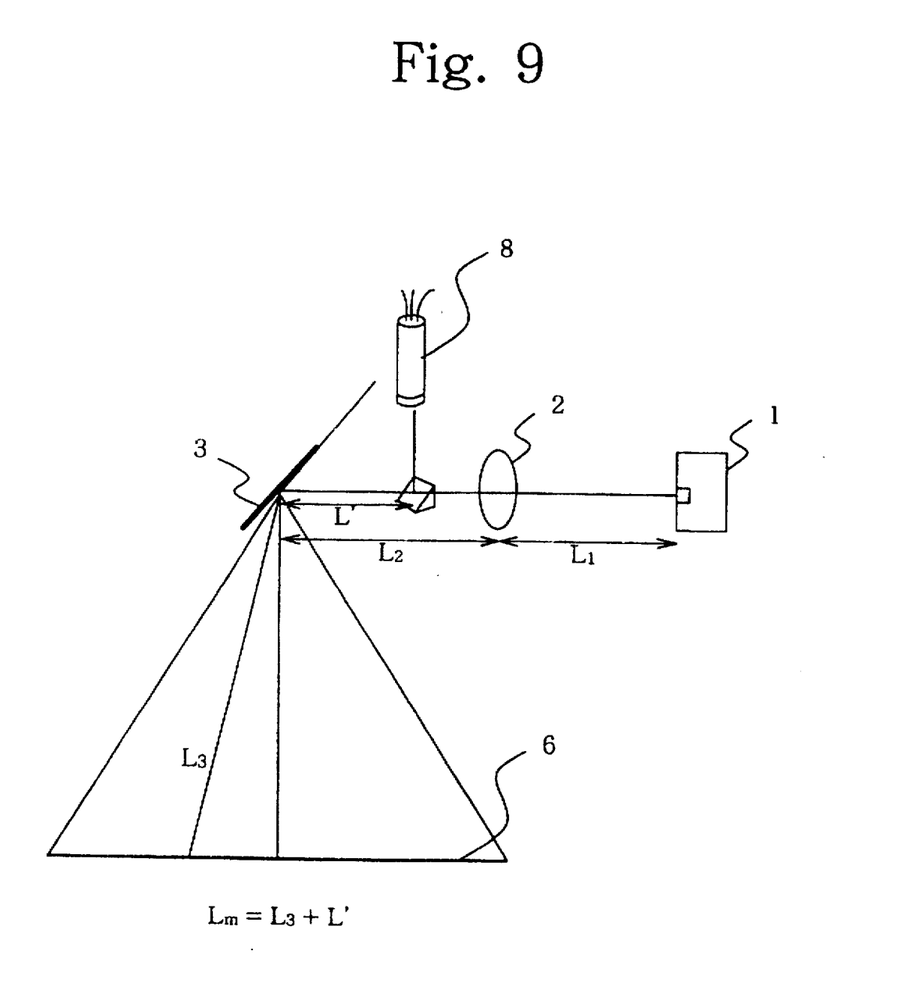
FIG. 9 is a schematic side elevational view showing the manner in which an optical path length is measured by an optical path length sensor in the image scanner shown in FIG. 7.

As shown in FIG. 8, an A/D converter 51 converts partial image signals from the one-dimensional image sensor 1 to digital image signals, and successively transfers the digital image signals to a partial image memory 52. An image converting means 60 converts the partial image data stored in the partial image memory 52 based on the optical path length from the reflecting mirror 3 to the reading line 7, and transfers the converted image data to an image memory 54. The image converting means 60 can convert the partial image data in the same manner as with the image converting means 20 in the image converter 5 shown in FIG. 4. However, since the optical path length sensor 8 can measure an optical path length $L_m$ in FIG. 9, and the optical path length L3 is expressed by:

$$L_3 = L_m - L',$$

it is not necessary to determine the optical path length $L_3$ from the cycle count N, and the ROM which stores conversion tables in the first and second embodiments is dispensed with.

Figure 10:
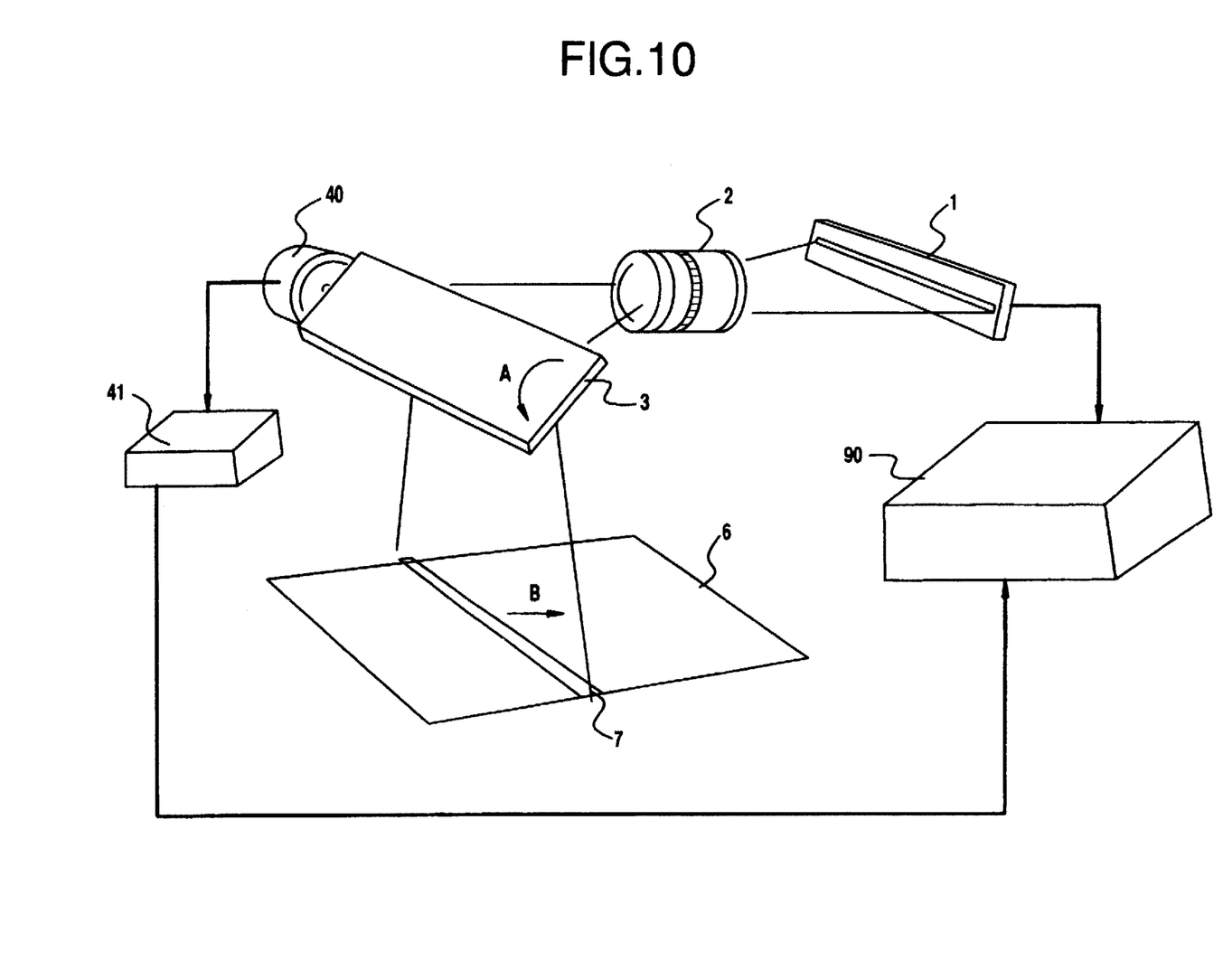
FIG. 10 is a schematic perspective view of an image scanner according to a fourth embodiment of the present invention.

FIG. 10 shows an image scanner according to a fourth embodiment of the present invention.

The image scanner according to the fourth embodiment has an auxiliary scanning mechanism 40 capable of outputting a signal indicative of an angular displacement of a reflecting mirror 3 as disclosed in Japanese laid-open patent publication No. 6-133079, a reflecting mirror angular displacement detecting means 41 for detecting an angular displacement of the reflecting mirror 3 based on the signal from the auxiliary scanning mechanism 40, and an image converter 90 for converting image data based on the angular displacement detected by the reflecting mirror angular displacement detecting means 41. Other details of the image scanner according to the fourth embodiment are the same as those of the image scanner according to the first embodiment shown in FIG. 3, and are denoted by identical reference numerals and will not be described in detail below.

In the fourth embodiment, the reflecting mirror angular displacement detecting means 41 detects an angular displacement of the reflecting mirror 3 based on the signal from the auxiliary scanning mechanism 40, and supplies the detected angular displacement to the image converter 90.

Figure 11:
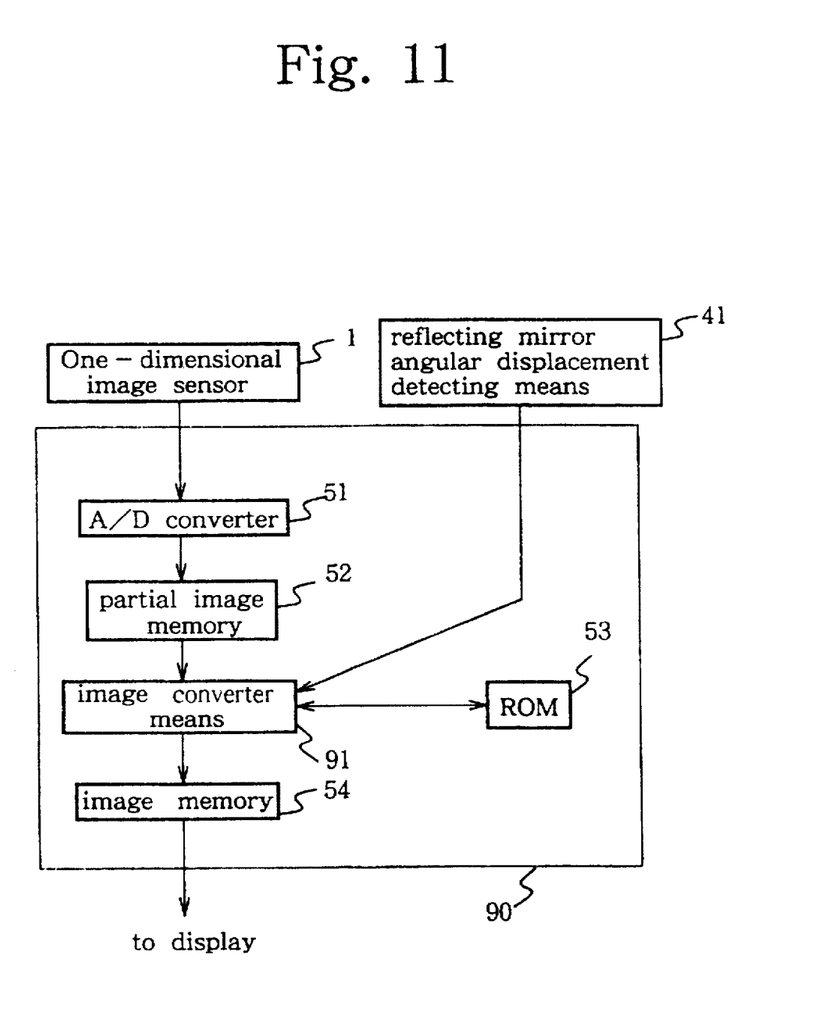
FIG. 11 is a block diagram of an image converter in the image scanner shown in FIG. 10.

FIG. 11 shows in block form the image converter 90. The image converter 90 shown in FIG. 11 is similar to the image converter 5 shown in FIG. 4 except for the image converting means. In FIG. 11, the image converting means is denoted by a different reference numeral than that in FIG. 4, and the other components of the image converter 90 shown in FIG. 11 are denoted by the same reference numerals as those in FIG. 4.

As shown in FIG. 11, an A/D converter 51 converts partial image signals from the one-dimensional image sensor 1 to digital image signals, and successively transfers the digital image signals to a partial image memory 52. A ROM 53 stores conversion tables calculated according to conversion coefficients which vary from one main scanning cycle count N to the next main scanning cycle count N. An image converting means 91 determines a main scanning cycle count N based on the angular displacement detected by the reflecting mirror angular displacement detecting means 41, reads a conversion table based on the main scanning cycle count N from a counter 31 from the ROM 53, converts the partial image data stored in the partial image memory 52 according to the conversion table, and transfers the converted image data to an image memory 54.

The image converting means 91 can convert the partial image data in the same manner as with the image converting means 20 in the image converter 5 shown in FIG. 4.

In the fourth embodiment, the data stored in the ROM 53 shown in FIG. 11 are the same as those stored in the ROMs in the first and second embodiments, and the image converting means 91 determines a main scanning cycle count N based on the angular displacement of the reflecting mirror 3. However, the ROM 53 may store conversion tables generated based on the angular displacement θ of the reflecting mirror 3 according to the equations (1)-(4), and the image converting means 91 may convert image data according to a conversion table depending on the angular displacement θ detected by the reflecting mirror angular displacement detecting means 41.

The image scanner according to the present invention can remove, through an image conversion process, a barrel distortion caused in an image when the auxiliary scanning mechanism angularly moves the reflecting mirror. Therefore, only the reflecting mirror may be rotated when the original is scanned in the auxiliary scanning direction. Since it is not necessary to move other mechanical parts of the image scanner according to the present invention, any vibration of the image scanner is relatively small, and the image scanner can scan the original at high speed in the auxiliary scanning direction. The image scanner can read images at high speed, and can produce images of improved quality.

While preferred embodiments of the present invention have been described using specific terms, such description is for illustrative purposes only, and it is to be understood that changes and variations may be made without departing from the spirit or scope of the following claims.

What is claimed is:

1. An image scanner comprising:

a reflecting mirror for reflecting a light beam from an original;

a one-dimensional image sensor for scanning the original in a main scanning direction with the reflected light beam from said reflecting mirror to produce a partial image of the original;

an auxiliary scanning mechanism for angularly moving said reflecting mirror to cause the reflected light beam to scan the original in an auxiliary scanning direction transverse to said main scanning direction, thereby to enable said one-dimensional image sensor to produce in main scanning cycles respective partial images of the original which may be combined into a two-dimensional image of the original; and an image converter for converting the partial images depending on changes in an optical path length from said original to said one-dimensional image sensor, said optical path length being made to change in accordance with the angular movement of said reflecting mirror;

wherein said image converter comprises an optical path length sensor for measuring said optical path length when the original is scanned in said auxiliary scanning direction and image converting means for converting the partial images depending on the optical path length measured by said optical path length sensor.

2. An image scanner comprising:

a reflecting mirror for reflecting a light beam from an original;

a one-dimensional image sensor for scanning the original in a main scanning direction with the reflected light beam from said reflecting mirror to produce a partial image of the original;

an auxiliary scanning mechanism for angularly moving said reflecting mirror to cause the reflected light beam to scan the original in an auxiliary scanning direction transverse to said main scanning direction, thereby to enable said one-dimensional image sensor to produce in main scanning cycles respective partial images of the original which may be combined into a two-dimensional image of the original; and an image converter for converting the partial images depending on changes in an optical path length from said original to said one-dimensional image sensor, said optical path length being made to change in accordance with the angular movement of said reflecting mirror;

wherein said image converter comprises:

a counter for counting the main scanning cycles;

image converting means for converting the partial images depending on a main scanning cycle count from said counter, wherein a change in the main scanning cycle count represents a corresponding change in the optical path length from said original to said one dimensional image sensor; and a memory for storing conversion tables calculated according to different conversion coefficients depending on respective main scanning cycle counts;

said image converting means comprising means for converting the partial images based on a conversion table read from said memory according to the main scanning cycle count from said counter.

3. An image scanner comprising:

a reflecting mirror for reflecting a light beam from an original;

a one-dimensional image sensor for scanning the original in a main scanning direction with the reflected light beam from said reflecting mirror to produce a partial image of the original;

an auxiliary scanning mechanism for angularly moving said reflecting mirror to cause the reflected light beam to scan the original in an auxiliary scanning direction transverse to said main scanning direction, thereby to enable said one-dimensional image sensor to produce in main scanning cycles respective partial images of the original which may be combined into a two-dimensional image of the original; and an image converter for converting the partial images depending on changes in an optical path length from said original to said one-dimensional image sensor, said optical path length being made to change in accordance with the angular movement of said reflecting mirror;

wherein said image converter comprises:

an image memory for storing entire image data of the original and separately outputting image data of partial images corresponding to the respective main scanning cycles;

a counter for counting the number of times that the image data of partial images are outputted from said image memory, as a main scanning cycle count;

image converting means for converting the partial images depending on the main scanning cycle count from said counter, wherein a change in the main scanning cycle count represents a corresponding change in the optical path length from said original to said one-dimensional image sensor; and a memory for storing conversion tables calculated according to different conversion coefficients depending on respective main scanning cycle counts;

said image converting means comprising means for converting the partial images based on a conversion table read from said memory according to the main scanning cycle count from said counter.

4. An image scanner comprising:

a reflecting mirror for reflecting a light beam from an original;

a one-dimensional image sensor for scanning the original in a main scanning direction with the reflected light beam from said reflecting mirror to produce a partial image of the original;

an auxiliary scanning mechanism for angularly moving said reflecting mirror to cause the reflected light beam to scan the original in an auxiliary scanning direction transverse to said main scanning direction, thereby to enable said one-dimensional image sensor to produce in main scanning cycles respective partial images of the original which may be combined into a two-dimensional image of the original;

an image converter for converting the partial images depending on changes in an optical path length from said original to said one-dimensional image sensor, said optical path length being made to change in accordance with the angular movement of said reflecting mirror; and reflecting mirror angular displacement detecting means for detecting an angular displacement of said reflecting mirror when the original is scanned in said auxiliary scanning directions;

wherein said image converter comprises:

image converting means for converting the partial images depending on the angular displacement detected by said reflecting mirror angular displacement detecting means.

5. An image scanner according to claim 4, wherein said image converter further comprises:

a memory for storing conversion tables calculated according to different conversion coefficients depending on respective angular displacements of the reflecting mirror;

said image converting means comprising means for converting the partial images based on a conversion table read from said memory according to the angular displacement detected by said reflecting mirror angular displacement detecting means.

6. An image scanner according to claim 4, wherein said image converter further comprises:

a memory for storing conversion tables calculated according to different conversion coefficients depending on respective main scanning cycle counts;

said image converting means comprising means for determining a main scanning cycle count from the angular displacement detected by said reflecting mirror angular displacement detecting means, and converting the partial images based on a conversion table read from said memory according to the determined main scanning cycle count.

* * * * *